United States Patent
Chatting et al.

(10) Patent No.: US 7,333,672 B2
(45) Date of Patent: Feb. 19, 2008

(54) IMAGE PROCESSING SYSTEM/NETWORK WHICH PERFORMS RECOGNITION PROCESS ONLY UPON REGIONS HAVING HIGHER HIGH SPATIAL FREQUENCY CONTENT

(75) Inventors: David J Chatting, Ipswich (GB); David G Morrison, Felixstowe (GB)

(73) Assignee: British Telecommunications public limited company, London (GB)

( * ) Notice: Subject to any disclaimer, the term of this patent is extended or adjusted under 35 U.S.C. 154(b) by 852 days.

(21) Appl. No.: 10/221,557

(22) PCT Filed: Mar. 6, 2001

(86) PCT No.: PCT/GB01/00963

§ 371 (c)(1), (2), (4) Date: Sep. 13, 2002

(87) PCT Pub. No.: WO01/75797

PCT Pub. Date: Oct. 11, 2001

(65) Prior Publication Data
US 2003/0053693 A1 Mar. 20, 2003

(30) Foreign Application Priority Data
Mar. 30, 2000 (EP) .................. 00302699

(51) Int. Cl.
*G06K 9/40* (2006.01)
*G06K 9/48* (2006.01)

(52) U.S. Cl. ............ 382/266; 382/199; 382/263; 382/264

(58) Field of Classification Search ........... None
See application file for complete search history.

(56) References Cited

U.S. PATENT DOCUMENTS

| | | | | |
|---|---|---|---|---|
| 4,194,221 A | * | 3/1980 | Stoffel | 358/3.08 |
| 4,404,594 A | * | 9/1983 | Hannan | 348/355 |
| 4,656,507 A | * | 4/1987 | Greaves et al. | 348/26 |
| 5,163,094 A | * | 11/1992 | Prokoski et al. | 382/118 |
| 5,481,628 A | * | 1/1996 | Ghaderi | 382/261 |
| 5,568,571 A | * | 10/1996 | Willis et al. | 382/254 |
| 5,647,025 A | * | 7/1997 | Frost et al. | 382/255 |
| 5,748,802 A | * | 5/1998 | Winkelman | 382/271 |
| 5,805,727 A | * | 9/1998 | Nakano | 382/195 |
| 5,864,630 A | * | 1/1999 | Cosatto et al. | 382/103 |
| 6,141,461 A | * | 10/2000 | Carlini | 382/261 |
| 6,301,385 B1 | * | 10/2001 | Chen et al. | 382/173 |
| 6,459,816 B2 | * | 10/2002 | Matsuura et al. | 382/248 |
| 6,545,715 B1 | * | 4/2003 | Na | 348/351 |
| 6,603,874 B1 | * | 8/2003 | Stern et al. | 382/144 |
| 6,625,326 B1 | * | 9/2003 | Cho | 382/266 |
| 6,792,135 B1 | * | 9/2004 | Toyama | 382/118 |
| 6,928,196 B1 | * | 8/2005 | Bradley et al. | 382/300 |

FOREIGN PATENT DOCUMENTS

WO   WO 99/23600   5/1999

* cited by examiner

*Primary Examiner*—Bhavesh M Mehta
*Assistant Examiner*—Charles Kim
(74) *Attorney, Agent, or Firm*—Nixon & Vanderhye P.C.

(57) ABSTRACT

An image recognition process applied to a photograph is preceded by a pre-processing step which identifies parts of the image which are in focus. The recognition process is then limited to those parts. The pre-processing typically operates by creating a measure of high spatial frequency activity and applying a threshold to them.

15 Claims, 4 Drawing Sheets

IMAGE PROCESSING SYSTEM/NETWORK WHICH PERFORMS RECOGNITION PROCESS ONLY UPON REGIONS HAVING HIGHER HIGH SPATIAL FREQUENCY CONTENT

This application is the U.S. national phase of international application PCT/GB01/00963 filed 6 Mar. 2001 which designated the U.S.

BACKGROUND

The present invention is concerned with image processing, and more particularly with—in a broad sense—image recognition. By recognition, here, is meant that the image is processed to produce some result which makes a statement about the image. There are a number of different contexts in which this can be useful.

For example, if the image is of a single object, it may be desired to identify the object as being as a specific one of a number of similar objects: the recognition of human face as being that of a particular person where picture is stored in a reference database would fall into this category. Alternatively it may be desired to identify an image as containing one or more pictures of objects and to classify it according to the nature of those objects. Thus the automation of the process of indexing or retrieval of images from a database could be facilitated by such recognition, particularly where a large database (or a large number of databases, as in the case of internet searches) is involved. Recognition may be applied not only to still pictures but also moving pictures—indeed, the increasing availability of audio-visual material has identified need to monitor material transmitted on television channels, or via video on demand systems, perhaps to verify that a movie film transmitted corresponds to that actually requested.

Currently there exist recognisers for various midrange features of images, for example the presence of vertical structures, skin regions or faces and whether the photograph is taken in or out of doors. One could envisage large networks of such recognisers working in combination to make higher level statements about an image. For example vertical structures with skin tones may be seen as good evidence for people, especially if a face can be found in the vicinity.

Given such a system we could create a list of objects and features for every image. However, even with this information we would have difficulty describing what the subject of the image was. Consider a newspaper picture editor looking for picture of birds. He makes a query to a large image database for birds. However, included in the results is a photograph of a couple sitting in a Parisian café, in the distance we can just make out a small bird in the branch of a tree. This picture clearly does not satisfy the query as the editor intended it. Most human descriptions of this picture would exclude the bird, because it seems unimportant. If we could judge the relative importance of each feature we could describe to what extent it was the subject. So in the case of the Parisian café the bird would be judged to be quite unimportant.

BRIEF SUMMARY OF NON-LIMITING EXEMPLARY EMBODIMENTS

According to one aspect of the invention there is provided a method of image processing comprising (a) identifying one or more significant regions having a higher high spatial frequency content than does the remainder of the image; and
(b) performing a subsequent recognition process only upon said identified regions.

Other, preferred, aspects of the invention are set out in the subclaims.

BRIEF SUMMARY OF THE DRAWINGS

Some embodiments of the invention will now be described, by way of example, with reference to the accompanying drawings.

FIG. 3a shows an image which produces an edge map.

FIG. 3b shows an image of the edge map produced from the image of FIG. 3a.

FIG. 3c shows an image of a map.

FIG. 3d shows the image of FIG. 3a, with all parts satisfying a certain criterion being set to zero (black).

DETAILED DESCRIPTION OF NON-LIMITING EXEMPLARY EMBODIMENTS

It is assumed that the image to which a recognition process is to be applied is a photographic image, by which is meant the fixture of an image formed by focussing the light reflected from a real object, such as by conventional photography, cinematography or a recording (or a single stored frame) from a television camera. However the utility of the invention is not limited to photographic images.

Figure 1:
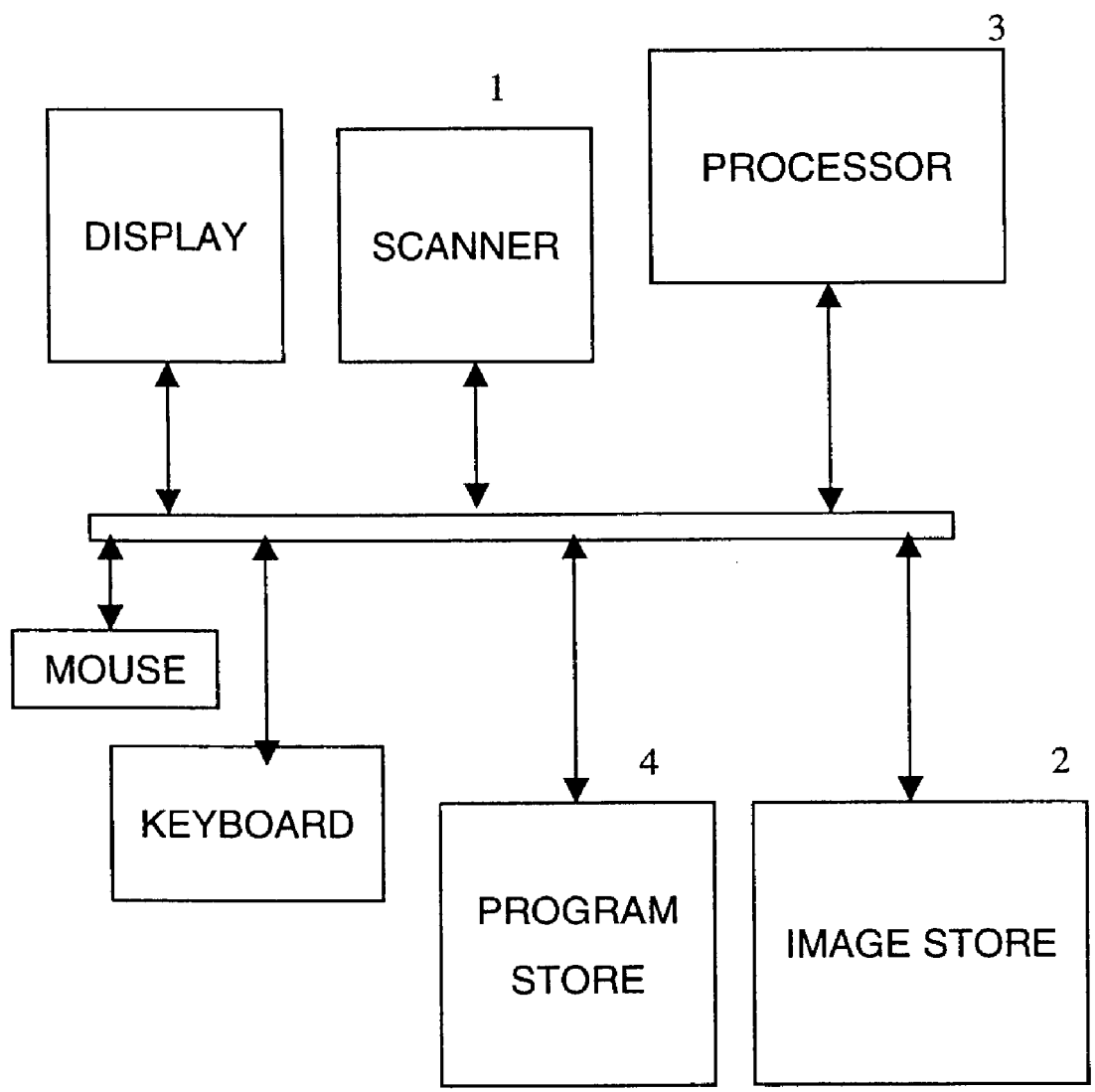
FIG. 1 is a block diagram of an image recognition apparatus.

As shown in FIG. 1, the apparatus comprises an acquisition device 1 which may be a scanner for scanning photographs or slides, or a device for capturing single frames from a video signal. Such devices are well-known, as indeed is software for driving the devices and storing the resulting image in digital form. The apparatus also has an image store 2 for receiving the digital image, a processing unit 3 and a program store 4. These items might conveniently be implemented in the form of a conventional desktop computer.

The program store 4 contains, as well as the driver software already mentioned, a program for implementing the process now to be described.

The rationale of the present approach is that a recognition process may be improved by confining it to significant parts of the image, and moreover is based on the premise that the relative focus of different parts of an image is a good guide to its significance. This is likely to be the case in practice since a photographer (or a person setting up an automatically operated camera) will aim to have the subject(s) of the photograph in focus.

Clearly this places some constraint on the spatial resolution needed in the digitised image since with a very coarse digital image the focus information would be lost in the digitisation process. The test image used to produce the results shown in FIG. 3 had a resolution of 450×360 picture elements.

The approach adopted here is to identify from, over the area of the image, a measure representative of the level of high spatial frequency detail, and then to apply a decision step in which the region or regions of the image having a high value of this measure are considered to be in focus and those having a low value are considered to be out of focus, as the presence of sharply defined edges are considered a good indication of focus. The actual required recognition process in then performed only in respect of the in-focus areas. Alternatively, the estimation of a region's focus may be used to bias the importance of features recognised there.

Figure 2:
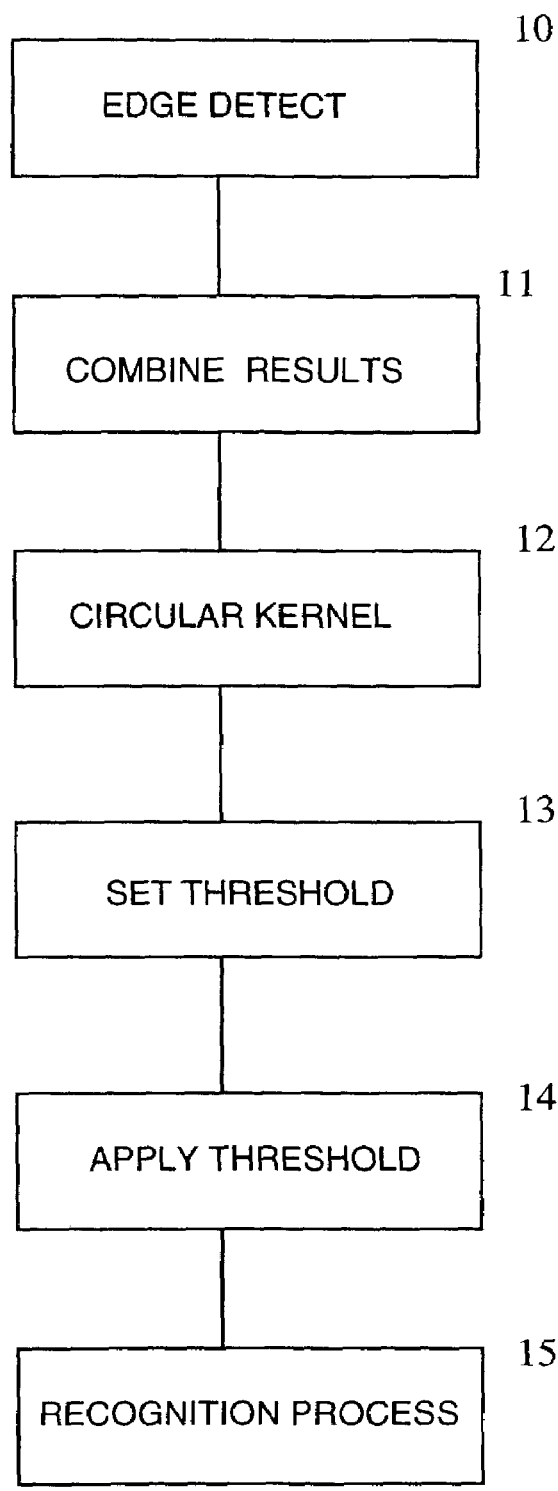
FIG. 2 is a flowchart showing a method of generating a measure representative of a level of high spatial frequency detail.

One method of generating the measure is as follows where numbers refer to steps in the flowchart of FIG. 2.

Assume that the photograph is digitised as an M×N image and stored as pixel luminance values $p(m,n)$ ($m=0 \ldots M-1$, $n=0 \ldots N-1$) where $p(0,0)$ is top left, m is horizontal position and n vertical.

If the image is stored as R, G, B values, luminance values may be re-calculated from these in known manner. Colour information is not used in forming the measure, though it may be used later.

Step 10: Edge Detection

The image is convolved with two kernels representing a filtering operation, to form an edge map $E=e(m,n)$ ($m=0 \ldots M-2, n=0 \ldots N-2$) where $$e(m,n)=k_{00}p(m,n)+k_{01}p(m+1,n)+k_{10}p(m,n+1)+k_{11}p(m+1,n+1)$$

and the kernel K is $$\begin{bmatrix} k_{00} & k_{01} \\ k_{10} & k_{11} \end{bmatrix}$$

In fact two maps $E_1=e_1(m,n)$ and $E=e_2(m,n)$ are generated using the well-known Roberts Cross convolution kernels:

$$K = \begin{bmatrix} 1 & 0 \\ 0 & -1 \end{bmatrix} \text{ or } K = \begin{bmatrix} 0 & 1 \\ -1 & 0 \end{bmatrix}$$

Step 11: The elements e of the edge maps each have a value in the range of −255 to +255. As the sign of luminance transitions is not significant the modulus is taken; also the two maps are combined by taking the mean, i.e.

$$e(m, n) = \frac{1}{2}(|e_1(m, n)| + |e_2(m, n)|) \ m = 0 \ldots M - 2, n = 0 \ldots N - 2$$

In another embodiment of the invention the two maps are combined using the following equation:-

$$e(m,n)=\sqrt{(e_1(m,n)^2+(e_2(m,n)^2)} \ m=0 \ldots M-2, n=0 \ldots N-2$$

The values $e(m,n)$ are stored in a further area of the image store 2.

The two kernels used here have, respectively, maximum sensitivity in the two diagonal directions and thus the combined result is sensitive to the edges of any orientation. However the resultant map has high values only in the immediate vicinity of an edge. Thus the image shown in FIG. 3a produces an edge map which, when displayed as an image, appears as in FIG. 3b. Note that, for clarity, FIG. 3b is shown as a negative of this. The next stage is to spread or merge these so that neighbouring edges can be recognised as part of a continuous in-focus region.

Step 12: One method of achieving this is to convolve the edge map with a circular kernel of the form (for a 7×7 kernel). It will be observed that this has the effect of spatial low-pass filtering of the map E.

$$C = \begin{bmatrix} c_{00} & \cdots & c_{06} \\ \vdots & & \vdots \\ c_{60} & \cdots & c_{66} \end{bmatrix} = \begin{bmatrix} 0 & 0 & 1 & 1 & 1 & 0 & 0 \\ 0 & 1 & 1 & 1 & 1 & 1 & 0 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 0 & 1 & 1 & 1 & 1 & 1 & 0 \\ 0 & 0 & 1 & 1 & 1 & 1 & 0 \end{bmatrix}$$

(where we see that the nonzero values of $c_{ij}$ cover a circular area)

to produce a focus map:

$$F = f(m, n) = \frac{\sum_{i=0}^{6}\sum_{j=0}^{6} c_{ij} e(m+j-3, n+i-3)}{\sum_{i=0}^{6}\sum_{j=0}^{6} c_{ij}} \text{ for } m = 0 \ldots M - 2,$$

$$n = 0 \ldots N - 2$$

where e is deemed zero for positions outside the map E.

See below for discussion of the kernel size.

The appearance of such a map, if displayed as an image, would be as in FIG. 3c.

Step 13. Having obtained a map containing for each picture element, a measure f of the focus in the region thereof, it is necessary to make a decision as to which parts of the image are considered to be in focus and which are not. This can be done simply by comparing the measures with a threshold value so that only those elements with a measure above this value are considered to be in focus. The difficulty however lies in deciding what this threshold value should be. A fixed value is likely to be useful only if the images under consideration are fairly consistent in content. Possible methods of choosing the threshold would be on the basis of:

(a) the total area classified as in focus;

(b) the number of discrete contiguous regions classified as in focus;

(c) an estimation of the degree to which the classified region is in focus.

Figure 4:
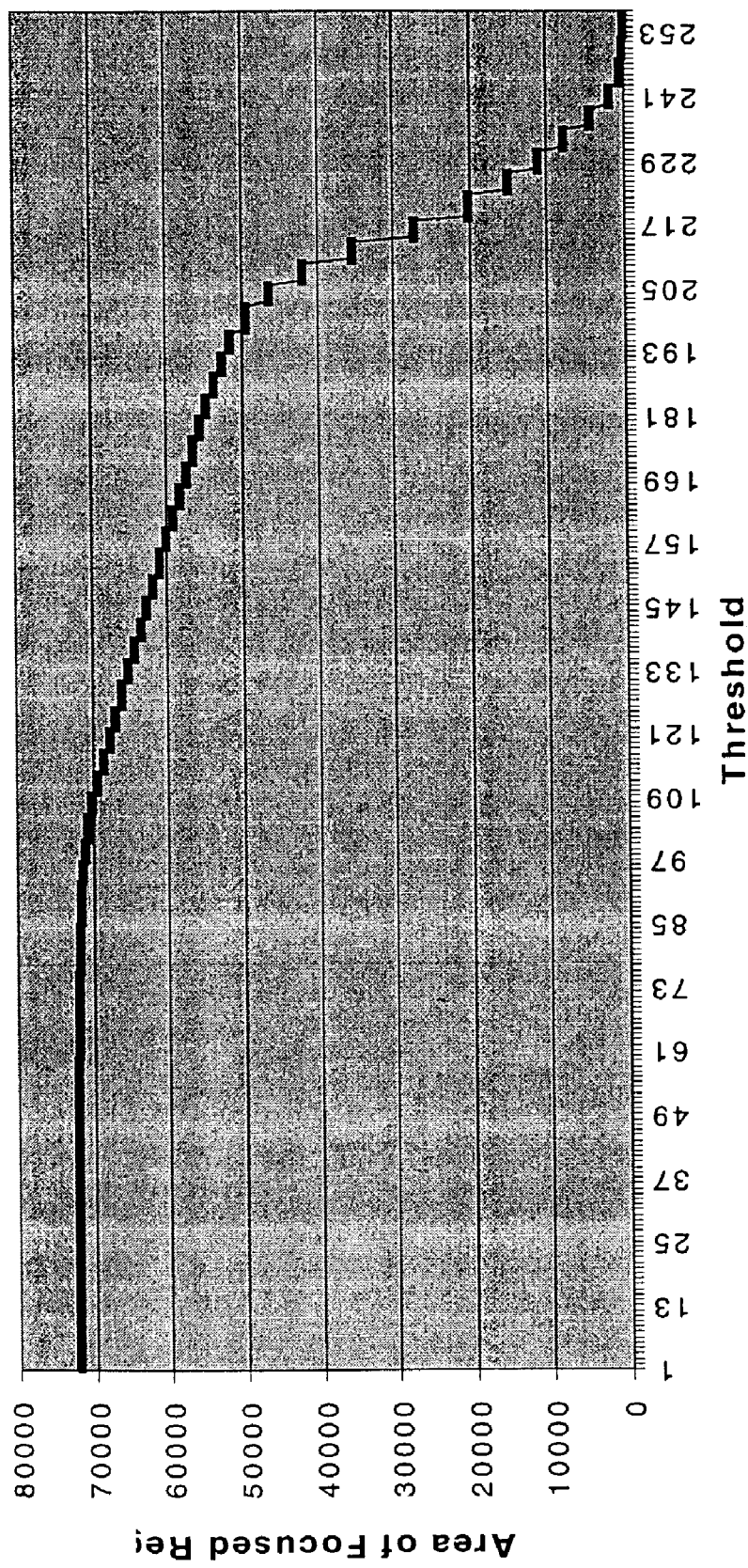
FIG. 4 is a graph of a deemed in-focus area plotted against a threshold valve.

FIG. 4 shows a typical graph of deemed in-focus area plotted against the threshold value, based on approach (a). All example of such functions are a stepped and monotropically decreasing. When the threshold is set at zero the area is that of the image, whilst when the threshold is at maximum the area is zero. The shape of the curve will depend on the distribution of the focus in the image. If the focused subject is a small area against a large uniformly out of focus background, the function will decrease very quickly as the background is removed at a low threshold. If there is a distribution of focus spread equally across the spectrum and image the area will decrease with a constant gradient. If the majority of the image is in focus and only a small area is not, the function will decrease slowly initially and decrease more rapidly at a higher threshold. The graph shown is characteristic of such an image.

In practice it is found that a "good" threshold is often found the "neck" of the area curve, that is the point on the curve which lies midway along the perimeter of the curve.

A practical solution based on approach (a) is to chose a threshold value such that if the area and threshold T are both normalised (i.e. $a=A/A_{tot}$ where $A_{tot}$ is the total area (MN) of the image and $t=T/255$) then $t=a(t)$.

Step 14: Having selected the threshold the result r(m,n) for any picture element is $r=1$ for $f \geqq t$ $r=0$ for $f<t$ The image of FIG. 3a, with all parts for which $r=0$ set to zero (black) is shown in FIG. 3d.

Where this process identifies more than one discrete region of the picture as being in focus, a focus score for each such region can if desired be generated which is the sum of the focal activity for that region (i.e. $\Sigma f(m,n)$ as defined above over that region, or more preferably the product of this and the area of the region). This could be used by a subsequent recognition process to weight the relative importance of the different regions.

Step 15: The desired recognition process may now be performed, it being understood that picture elements for which $r=0$ are excluded from the recognition process, or, alternatively that the picture elements for which $r=0$ are set to black before the recognition process is performed. The actual recognition process will not be described here, since many alternatives are available and, apart from the above-mentioned limitation to picture elements for which $r=1$, are performed in the conventional manner. Some recognition techniques are discussed in:

Flickner, M et al (1995) "Query by image and video content: the QBIC system" IEEE Computer, 28(9), 23-32.

Treisman A, "Features and objects in visual processing"; New Scientist, November 1986, page 106.

McCafferty, J D "Human and Machine vision: Computing perceptual Organisation" West Sussex, England: Ellis Horwood 1990.

Mohan, R and Netavia, R "Using perceptual organisation to extract 3D structures", IEEE Trans. Pattern. Anal. Machine Intell. Vol. 11 pp. 355-395, 1987.

Before this method can be implemented, a decision has to be made as to the size of the circular kernel C to be used to combine the edges into contiguous areas.

Whilst the invention should not be construed by reference to any particular theory, it is thought that a constructive approach to this question is to consider the perception of a human observer when viewing the image.

The retina lies at the back of the eye and is covered with light-sensitive cells, which send an electrical representation of reality to the brain, along the optic nerve. There are two different classes of cells on the retina, rods and cones. Rods are very sensitive to illumination and they are responsible for our perception of movement, shape, light and dark; however they are unable to discriminate colours. The majority of the 125 million rods are to be found in the periphery of the retina. Our ability to see colour and details is in the function of the cones. The majority of the eye's cones are packed densely into the *fovea centralis* where there are 150,000 per square millimetre. It is therefore this part of the retina where our vision is most acute. For this reason we move our eyes to project the region of interest onto the fovea, these jumps are known as saccades. Given that the angle visible to the fovea subtends approximately 2 degrees it is possible to predict the number of picture elements most acutely visible to the viewer, knowing their viewing distance and screen resolution. This is a naturally inspired definition of neighbourhood, which is used to determine the kernel size.

Thus it is suggested that a guideline for the kernel size should correspond to an area equivalent to a viewing angle of 2 degrees at a given picture size and viewing distance. If the size distance and distance are known, this may be calculated, or a reasonable assumption may be made.

For example, suppose that we want an area corresponding to a 2 degree field of view on a 17 or 21 inch monitor with a 3:4 aspect ratio and a viewing distance of 0.5 metres. A 2 degree field at 500 mm gives a circle on the screen of radius 500 sin (1°)=8.7 mm—i.e. an area of 239 sq. mm. A typical 17" monitor has a screen area 240×320 mm so that would represent a kernel of area $239/(240 \times 320)=0.0031$ or $1/320^{th}$ of the screen area. Assuming that a 21" screen has linear dimensions 21/17 times this, then we are looking at $1/490^{th}$ of the screen area. This suggests a kernel area of typically $1/300$ or $1/500$ of the image area.

Figure 3:
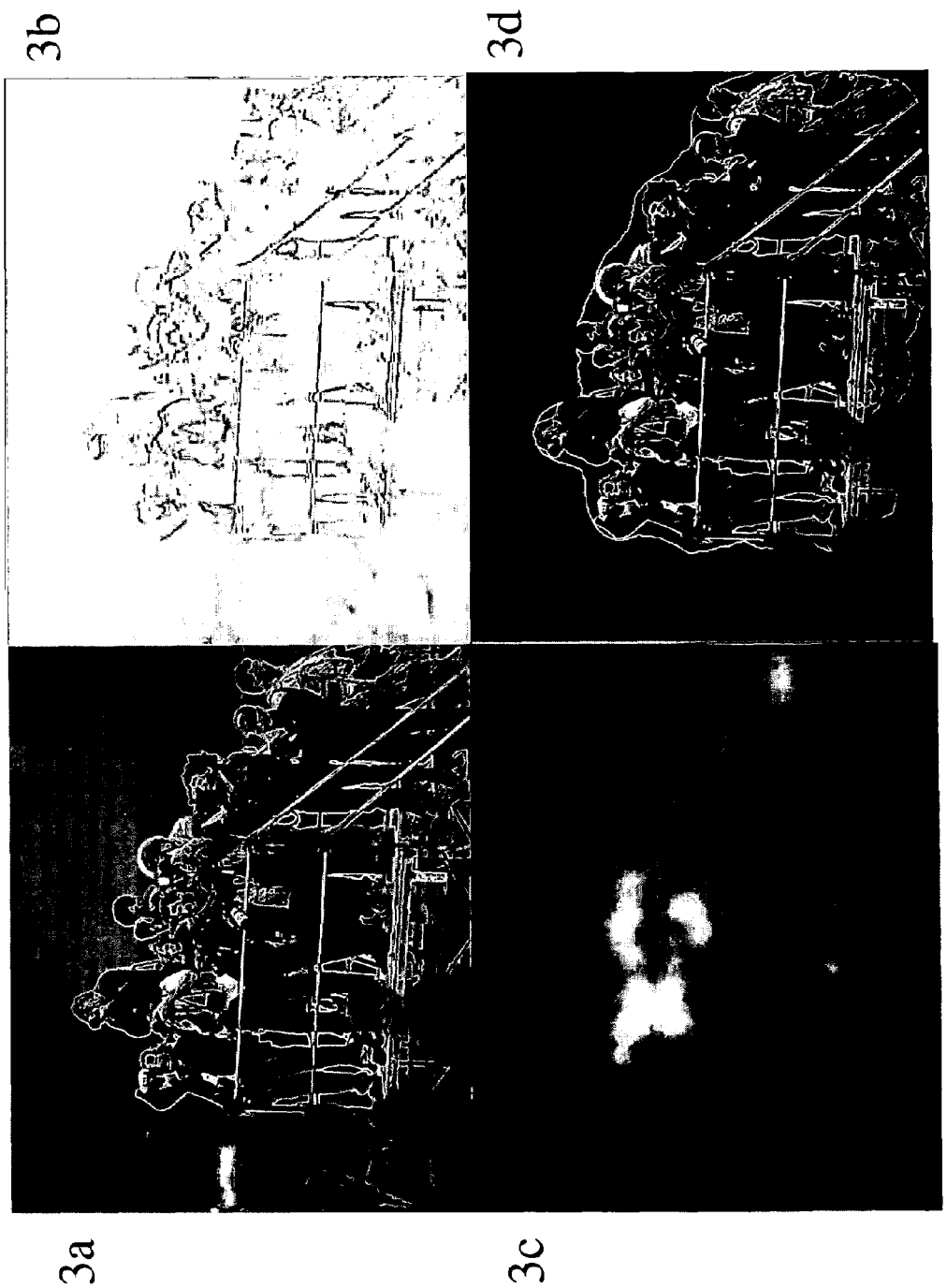

The kernel size used in the example of FIG. 3 was 14 pixels in diameter.

Some variations on the above theme will now be discussed. The edge detection process of step 10 has the merit of being a relatively simple process computationally, and has produced good results in practice; however a more sophisticated filtering process could be used if desired, or blocks of picture elements might be analysed by means of a transform such as the discrete cosine transform, and filtering by retaining only higher order coefficients. This might be particularly attractive when processing images that are already digitally coded by means of a transform-based coding algorithm. Similarly other circular kernels than the 'flat' example given above might be of use.

In the thresholding process, the procedure may be modified to limit the resulting number of discrete in-focus region rather than the total area of such regions (option (b) mentioned above), the rationale being that it is not generally useful to identify more than seven such areas.

Thus an alternative would be to calculate (i) the threshold as described in step 13;

(ii) the highest threshold which gives fewer than eight in-focus regions;

and choose the lower of the two. That is, if the original threshold gives more than seven regions, it is reduced until it no longer does.

What is claimed is:

1. A method of image processing comprising (a) receiving image data;

(b) processing the received image data to identify one or more significant regions having a higher high spatial frequency content than does the remainder of the image; and then (c) performing a subsequent recognition process upon the image data received in step (a), the subsequent recognition process being limited to said identified regions;

wherein step (b) comprises:

creating measures of high spatial frequency activity as a function of position with the image, comparing the measures with a threshold value, and signalling as significant regions those parts of the image having values of the measure which is indicative of greater high spatial frequency activity than the threshold value;

wherein the measures are created by applying a high-pass spatial filtering operation to the image in two different directions to produce first and second measures;

combining the first and second measures to produce a third measure; and applying a low-pass spatial filtering operation to the third measure; and wherein applying the low-pass spatial filtering operation merges neighboring areas of high spatial frequency activity.

2. A method according to claim 1, in which the threshold value is chosen adaptively in dependence on the statistics of the measures over the whole image.

3. A method according to claim 1, in which the threshold value is set, for the particular image, at a level such that the number of significant regions does not exceed a predetermined number.

4. The method as in claim 1, wherein step (b) includes forming at least one edge map.

5. A system for processing an image, the system comprising:

an image storing device for storing source data corresponding to a digital image; and a processing device for determining at least one part of the image which is in-focus relative to the remaining part(s) of the image, and then performing a recognition processing to the source data to produce a result which makes a statement about the image, the recognition processing being limited only to the source data corresponding to the at least one part of the image which is in-focus;

wherein the processing device is arranged to create measures of high spatial frequency activity as function of position within the image, and compare the measures with a threshold value to determine the at least one part of the image which is in-focus;

wherein the measures are created by applying a high-pass spatial filtering operation to the image in two different directions to produce first and second measures, combining the first and second measures to produce a third measure, and applying a low-pass spatial filtering operation to the third measure; and wherein applying the low-pass spatial filtering operation merges neighboring areas of high spatial frequency activity.

6. The system as in claim 5 wherein the result produced by the recognition processing is used to identify and/or classify the image.

7. The system as in claim 5 wherein the threshold value is chosen adaptively based on statistics of the measures over the whole image.

8. The system as in claim 5 wherein the threshold value is set, for the image, at a level such that the number of in-focus part(s) of the image does not exceed a predetermined number.

9. The system as in claim 5, wherein determining the at least one part of the image which is in-focus includes forming at least one edge map.

10. A method of processing an image, the method comprising:

storing original data corresponding to a digital image;

determining at least one part of the image which is in-focus relative to the remaining part(s) of the image, the determining including performing an edge detection to form at least one edge map having edges; and then performing a recognition processing, on the original data corresponding to the digital image, for producing a result which makes a statement about the image, the performed recognition processing being limited to only the original data corresponding to the at least one part of the image which is in-focus;

wherein the at least one edge map comprises a plurality of edge maps, and the method further comprises combining the plurality of edge maps to produce a measure, and applying a low pass spatial filtering to the measure to spread or merge edge so that neighboring edges can be recognized as part of a continuous in-focus part of the image.

11. The method as in claim 10 wherein the result produced by the recognition processing is used to identify and/or classify the image.

12. A method of image processing comprising:

(a) identifying one or more significant regions of an image having a higher high spatial frequency content than does a remainder of the image; and (b) performing a subsequent recognition process only upon said identified regions;

wherein said identifying step comprises creating measures of high spatial frequency activity as a function of position with the image, applying a low-pass spatial filtering operation to the measures so as to merge adjacent areas of high spatial frequency activity, comparing the measures with a threshold value, and signaling as significant regions those parts of the image having values of the measures which are indicative of greater high spatial frequency activity than the threshold value.

13. A method according to claim 12 in which the measures are created by:

applying a high-pass spatial filtering operation to the image in two different directions to produce first and second measures; and combining the first and second measures.

14. A method according to claim 12, in which the threshold value is chosen adaptively in dependence on the statistics of the measures over the whole image.

15. A method according to claim 12 in which the threshold value is set, for the particular image, at a level such that the number of significant regions does not exceed a predetermined number.

* * * * *